US011886636B2

(12) United States Patent
Fujimaki

(10) Patent No.: US 11,886,636 B2
(45) Date of Patent: Jan. 30, 2024

(54) HEAD-MOUNTED DISPLAY APPARATUS AND METHOD FOR CONTROLLING HEAD-MOUNTED DISPLAY APPARATUS

(71) Applicant: SEIKO EPSON CORPORATION, Tokyo (JP)

(72) Inventor: Yutaka Fujimaki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/975,610

(22) Filed: Oct. 28, 2022

(65) Prior Publication Data
US 2023/0134416 A1 May 4, 2023

(30) Foreign Application Priority Data

Oct. 28, 2021 (JP) .................................. 2021-176209

(51) Int. Cl.
| | |
|---|---|
| G06F 3/01 | (2006.01) |
| G06F 3/0346 | (2013.01) |
| G02B 27/01 | (2006.01) |
| G06T 11/00 | (2006.01) |

(52) U.S. Cl.
CPC ......... *G06F 3/013* (2013.01); *G02B 27/0179* (2013.01); *G06T 11/00* (2013.01); *G02B 2027/0187* (2013.01); *G06F 3/0346* (2013.01)

(58) Field of Classification Search
CPC ........ G06F 3/013; G06F 3/0346; G06F 3/011; G06F 3/012; G02B 27/0179; G02B 2027/0187; G02B 2027/0138; G02B 2027/014; G02B 2027/0178; G02B 27/0093; G02B 27/01; G02B 27/017; G02B 27/0172; G02B 27/02; G06T 11/00; H04N 5/33

See application file for complete search history.

(56) References Cited

U.S. PATENT DOCUMENTS

| | | | |
|---|---|---|---|
| 2016/0274358 A1 | 9/2016 | Yajima et al. | |
| 2018/0088323 A1* | 3/2018 | Bao | G02B 27/017 |
| 2019/0187477 A1 | 6/2019 | Fujimaki et al. | |
| 2020/0057487 A1* | 2/2020 | Sicconi | G06T 7/254 |
| 2020/0218341 A1* | 7/2020 | Young | G08B 7/06 |
| 2020/0371596 A1* | 11/2020 | Lee | G06F 9/542 |
| 2021/0124412 A1* | 4/2021 | Johnson | G08B 21/02 |

FOREIGN PATENT DOCUMENTS

| | | |
|---|---|---|
| JP | 2017-117175 | 6/2017 |
| JP | 2019-109850 | 7/2019 |

* cited by examiner

*Primary Examiner* — Mihir K Rayan
(74) *Attorney, Agent, or Firm* — JCIPRNET

(57) ABSTRACT

An HMD includes a display unit that transmits an outside scene, a line-of-sight detection unit that detects a line-of-sight direction of a user, a determination unit that calculates a risk level of the first target object, and determines an attention level for the first target object by correcting the risk level of the first target object based on the line-of-sight direction, and calculates a risk level of the second target object and determines an attention level for the second target object by correcting the risk level of the second target object based on the line-of-sight direction, and a display control unit that a display unit to display a first image related to the first target object when the attention level for the first target object is higher than the risk level of the second target object.

13 Claims, 10 Drawing Sheets

HEAD-MOUNTED DISPLAY APPARATUS AND METHOD FOR CONTROLLING HEAD-MOUNTED DISPLAY APPARATUS

The present application is based on, and claims priority from JP Application Serial Number 2021-176209, filed Oct. 28, 2021, the disclosure of which is hereby incorporated by reference herein in its entirety.

BACKGROUND

1. Technical Field

The present disclosure relates to a head-mounted display apparatus and a method for controlling the head-mounted display apparatus.

2. Related Art

In the related art, a technique for notifying a user wearing a head-mounted display apparatus (HMD) of a risk posed has been proposed. JP-A-2017-117175 discloses a configuration in which a moving object moving in an outside scene is identified and a display mode for a display image is set based on the speed of the moving object approaching the user.

In the configuration disclosed in JP-A-2017-117175, it is difficult to notify a user of an object moving at a low speed or a stationary object. For this reason, it is desirable to more appropriately call a user's attention to the possibility of an object or the like in the real space posing a risk to the user.

SUMMARY

An aspect of the present disclosure is a head-mounted display apparatus including a display unit that transmits an outside scene including a first target object and a second target object, a line-of-sight detection unit that detects a line-of-sight direction of a user, a time calculation unit that calculates a first time and second time, the first time being a time that the first target object requires to reach the user, and the second time being a time that the second target object requires to reach the user, and a determination unit that acquires a first information about the first target object and a second information about the second target object, that calculates a risk level of the first target object based on the first information and the first time, and that calculates a risk level of the second target object based on the second information and the second time, wherein the display unit displays a first image related to the first target object when an attention level for the first target object based on the line-of-sight direction and the risk level of the first target object is higher than an attention level for the second target object based on the line-of-sight direction and the risk level of the second target object.

Another aspect of the present disclosure is a method for controlling a head-mounted display apparatus, the method including a acquiring a first information about a first target object and second information about a second target object, detecting a line-of-sight direction of a user, calculating a first time and a second time, the first time being a time that the first target object requires to reach the user, and the second time being a time that the second target object requires to reach the user, calculating a risk level of the first target object based on the first information and the first time, calculating a risk level of the second target object based on the second information and the second time, and displaying a first image related to the first target object when an attention level for the first target object based on the line-of-sight direction and the risk level of the first target object is higher than an attention level for the second target object based on the line-of-sight direction and the risk level of the second target object.

DESCRIPTION OF EXEMPLARY EMBODIMENTS

1. Overall Configuration of HMD

Figure 1:
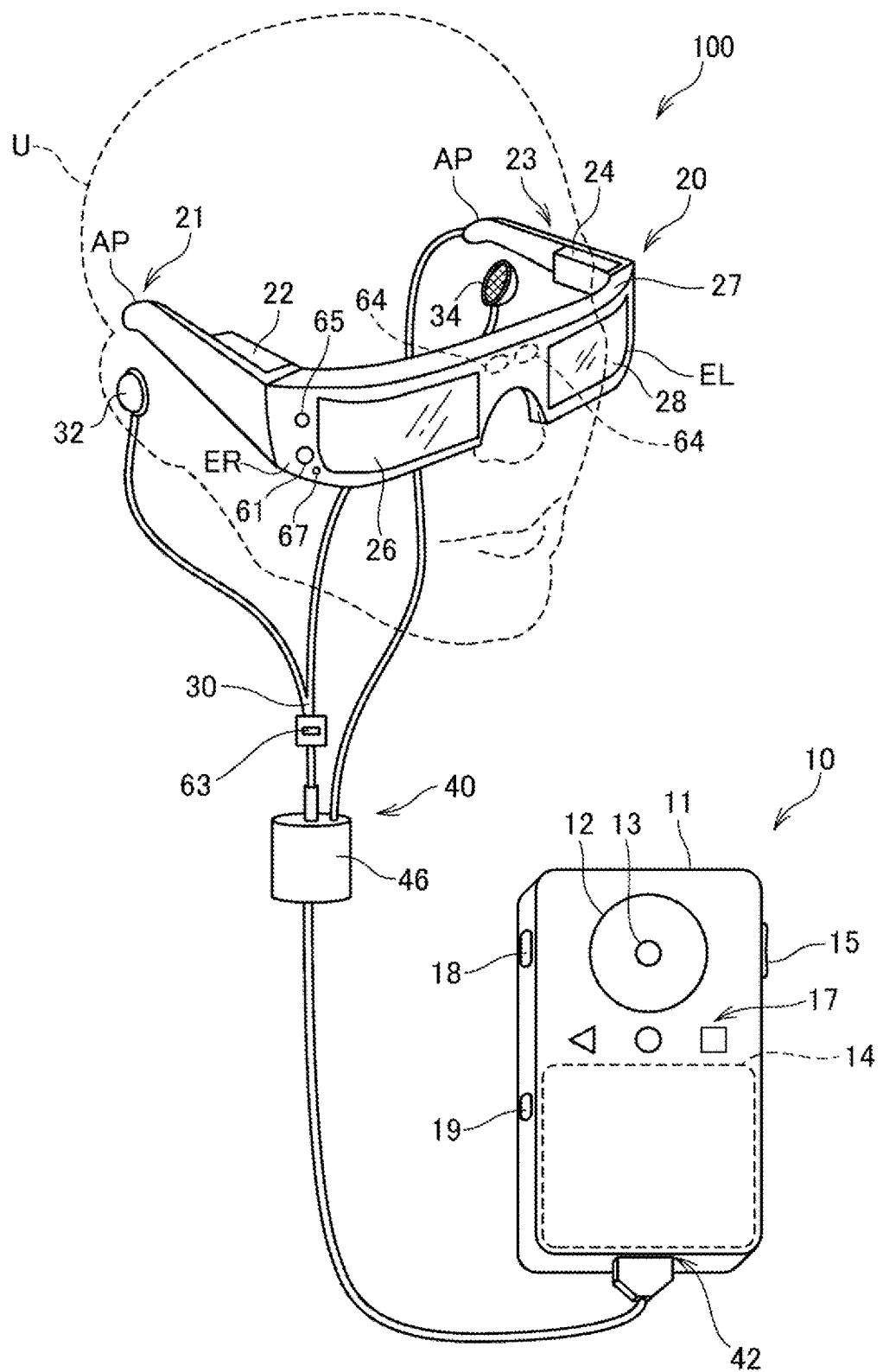
FIG. 1 is a diagram illustrating a configuration of an HMD.
Figure 2:
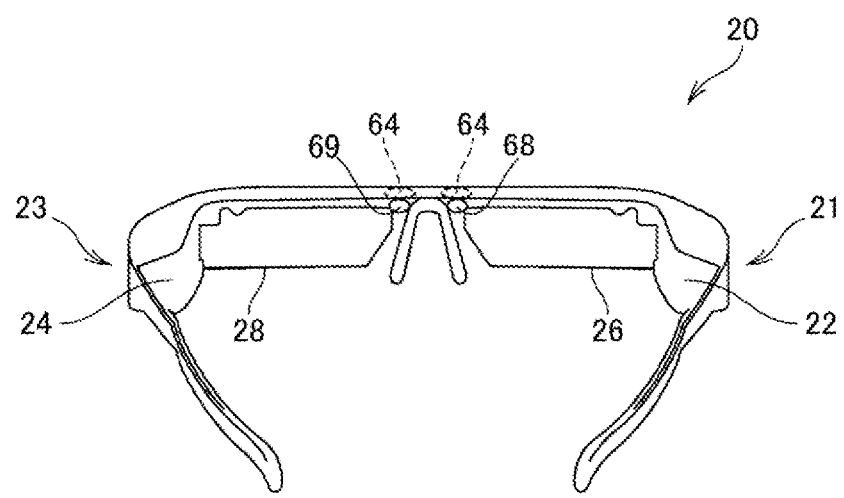
FIG. 2 is an external view of the HMD.

FIG. 1 is a diagram illustrating a configuration of an HMD 100. FIG. 2 is an external view of the HMD 100 and a perspective view taken from the face side of a user U.

The HMD 100 is a head-mounted display apparatus that a user U wears on his or her head. HMD is an abbreviation for Head Mounted Display.

The HMD 100 is of an optically transmissive type display apparatus that allows a user to visually recognize an outside scene in a direct manner and at the same time visually recognize virtual images. Here, an outside scene is an external view with respect to the user U wearing the HMD 100, and refers to a scene of a real space visually recognizable with the naked eye even when the user U is not wearing a display unit 20. The user U is a user of the HMD 100, and can also be referred to as an operator.

The HMD 100 includes the display unit 20 to be worn on the head of the user U, and a controller 10 that controls the display unit 20. The display unit 20 enables the user U to visually recognize virtual images while being worn on the head of the user. The controller 10 also functions as a control device that enables the user U to operate the HMD 100.

In the following description, a virtual image of the display unit 20 visually recognized by the user U will be referred to as a "display image" for convenience. Emitting image light based on image data from the display unit 20 of the HMD 100 will be referred to as "displaying an image". Images are not limited to still images, and also include moving images or videos. This configuration is an example, and for example, the HMD 100 may be optically opaque. In this case, the HMD 100 may be, for example, a so-called video see-through display apparatus. Specifically, the HMD 100 may be configured such that a display unit 20 without light transmission properties is provided and the user U can visually recognize an outside scene indirectly due to the display unit 20 displaying images captured by an external camera 61 to be described below.

The controller 10 has a box-shaped main body 11. The main body 11 includes various switches and the like as an operator for receiving operations of the user U. The display unit 20 has an eyeglasses shape in the present embodiment. The display unit 20 has the main body including a right holding part 21, a left holding part 23, and a front frame 27. The main body of the display unit 20 includes a right display unit 22, a left display unit 24, a right light-guiding plate 26, and a left light-guiding plate 28.

The right holding part 21 and the left holding part 23 extend rearward from the corresponding two ends of the front frame 27 to hold the display unit 20 on the head of the user U. One of the two ends of the front frame 27, which is positioned on the right side of the user U when she or he wears the display unit 20, is referred to as an end ER, and the other one of the two ends, which is positioned on the left side, is referred to as an end EL.

The right light-guiding plate 26 and the left light-guiding plate 28 are provided on the front frame 27. While the display unit 20 is worn, the right light-guiding plate 26 is positioned in front of the right eye of the user U. The left light-guiding plate 28 is positioned in front of the left eye of the user U.

Each of the right display unit 22 and the left display unit 24 is a module obtained by unitizing an optical unit and a peripheral circuit. The right display unit 22 is attached to the right holding part 21 and the left display unit 24 is attached to the left holding part 23. The right display unit 22 and the left display unit 24 emit imaging light based on image data.

The right light-guiding plate 26 and the left light-guiding plate 28 are optical components made of a light transmissive resin or the like. The right light-guiding plate 26 and the left light-guiding plate 28 are prisms, for example. The right light-guiding plate 26 guides imaging light output from the right display unit 22 to the right eye of the user U. The left light-guiding plate 28 guides imaging light output from the left display unit 24 to the left eye of the user. Therefore, the imaging light is incident on both eyes of the user U, and thus the user U can visually recognize an image.

Imaging light guided by the right light-guiding plate 26 and external light transmitted through the right light-guiding plate 26 are incident on the right eye of the user U. Imaging light guided by the left light-guiding plate 28 and external light transmitted through the left light-guiding plate 28 are incident on the left eye of the user U. In this way, the HMD 100 superimposes the imaging light corresponding to the internally processed image with the external lights and causes the superimposed light to be incident on the eyes of the user U. This allows the user U to see an outside scene through the right light-guiding plate 26 and the left light-guiding plate 28. Furthermore, the user U can see the image from the imaging light over the outside scene.

A shade attenuating outside light incident on the right and left eyes of the user U may be provided on each of the surfaces of the right light-guiding plate 26 and the left light-guiding plate 28. The shade may be an electronic shade capable of electrically adjusting the transmittance of light.

An illuminance sensor 65 is disposed on the front frame 27. The illuminance sensor 65 receives outside light coming from in front of the user U wearing the display unit 20.

The external camera 61 is disposed on the front frame 27. In the example in FIG. 1, the external camera 61 is disposed on the end ER side of the front frame 27. The external camera 61 is a digital camera that captures an imaging range including the side in front of the user U. The external camera 61 is provided at a position at which outside light transmitted through the right light-guiding plate 26 and the left light-guiding plate 28 is not blocked. The position of the external camera 61 is not limited to the example of FIG. 1. The external camera 61 may be disposed at the coupling portion of the right light-guiding plate 26 and the left light-guiding plate 28, rather than on the end EL side. The external camera 61 corresponds to an example of a capturing unit.

The external camera 61 is a digital camera including an image sensor such as a CCD or a CMOS, or an imaging lens. Although the external camera 61 according to the present embodiment is a monocular camera, it may be a stereo camera. The external camera 61 performs imaging in accordance with control by a control unit 120, which will be described below, and outputs captured image data to the control unit 120. The external camera 61 has an imaging lens. The imaging lens of the external camera 61 may be a so-called wide-angle lens. The wide-angle lens may include a super-wide-angle lens or a semi-wide-angle lens. The imaging lens of the external camera 61 may also include a single focus lens, a zoom lens, or a lens group including a plurality of lenses. CCD is an abbreviation for Charge Coupled Device. CMOS is an abbreviation for Complementary Metal-Oxide Semiconductor.

Am LED indicator 67 is disposed on the front frame 27. The LED indicator 67 is disposed adjacent to the external camera 61 at the end ER and is lit up while the external camera 61 is operating to give a notification that the capturing is in progress. LED is an abbreviation for Light Emitting Diode.

A distance sensor 64 is provided on the front frame 27. The distance sensor 64 detects a distance from the display unit 20 to a measurement target object positioned in front of the user U. The measurement target object is a real object or a structure in a real space. The distance sensor 64 may be, for example, a light reflecting distance sensor. Specifically, a sensor having a light source such as an LED and a laser diode and a light receiving unit that receives reflection light obtained by light emitted from the light source being reflected on a measurement target object may be exemplified. In addition, the distance sensor 64 may also be an ultrasonic distance sensor. In other words, the distance sensor 64 may include a sound source that emits ultrasonic waves and a detection unit that receives ultrasonic waves reflected by a measurement target object. In addition, the distance sensor 64 may be a laser range scanner that is also called a range sensor.

As will be described below, the HMD 100 has the control unit 120 execute a SLM process using at least one of the external camera 61 and the distance sensor 64. The control unit 120 creates an environment map of objects around the user U wearing the display unit 20, and identifies the self-position of the user U on the environment map. The distance sensor 64 is a sensor for performing the SLAM process, and specifically may be a sensor included in a Lidar system. The distance sensor 64 is not limited to a sensor that detects a distance between a measurement target object and the display unit 20, and may be, for example, a laser range scanner. SLAM is an abbreviation for Simultaneous Localization and Mapping. Lidar is an abbreviation for Light Detection and Ranging or Laser Imaging Detection and Ranging. When a processor 125 can use only the external camera 61 to execute SLAM, the HMD 100 may not include the distance sensor 64.

The HMD 100 may include a gas sensor that detects a gas component around the user U or other environmental sensors, along with the distance sensor 64, or instead of the distance sensor 64.

In addition, although not illustrated, a thermal camera 66 is provided on the front frame 27. The thermal camera 66 is a camera that captures infrared light, and outputs image data of the infrared image. The infrared image captured by the thermal camera 66 indicates a temperature distribution within the imaging range of the thermal camera 66. The imaging range of the thermal camera 66 overlaps the imaging range of the external camera 61.

The controller 10 and the display unit 20 are coupled by a coupling cable 40. The coupling cable 40 is detachably coupled to a connector 42 of the main body 11.

The coupling cable 40 includes an audio connector 46. The audio connector 46 is coupled to a headset 30. The headset 30 includes a right earphone 32 and a left earphone 34 constituting a stereo headphone, and a microphone 63.

A right earphone 32 is mounted on the right ear of the user U. A left earphone 34 is mounted on the left ear of the user U. The right earphone 32 and the left earphone 34 are in-ear-type earphones, or canal-type earphones. The right earphone 32 and the left earphone 34 may be an overhead-type headphone that contacts the pinnas via the earmuffs. The right earphone 32 and the left earphone 34 output sound based on a sound signal output from a sound interface 181 which will be described below.

A microphone 63 collects sound and outputs a sound signal to the sound interface 181. The microphone 63 may be a monaural microphone or a stereo microphone. The microphone 63 may be, for example, a directional microphone or a non-directional microphone.

The controller 10 includes a wheel operation unit 12, a central key 13, an operation pad 14, an up/down key 15, an LED display unit 17, and a power switch 18. These can also be referred to as operated units that are operated by the user U. These operated parts are disposed on a surface of the main body 11. These operated parts are operated with a finger of the user U, for example.

A LED display unit 17 is installed on the main body 11. The LED display unit 17 is an LED indicator indicating a state of the operating HMD 100. The LED display unit 17 is covered by a transmission part that can transmit light. The cover of the LED display unit 17 constitutes a portion of the surface of the main body 11. When the LED display unit 17 emits light, the light is transmitted through the transmission part. This makes it possible to visually recognize letters, symbols, patterns, and the like formed on the transmission part. A touch sensor that detects contact of the fingers of the user U is disposed on the LED display unit 17 over the transmission part. The LED display unit 17 and the touch sensor are combined to function as software keys.

The power switch 18 is a switch to turn on or off the power of the HMD 100.

The main body 11 includes a USB connector 19 as an interface for coupling the controller 10 to external devices. USB is an abbreviation for Universal Serial Bus.

An internal camera 68 facing the face of the user U while the user U wears the display unit 20 is provided on the front frame 27. The HMD 100 of the present embodiment includes a pair of internal cameras 68. Specifically, the internal camera 68 facing the right eye of the user U and the internal camera 68 facing the left eye of the user U are provided. The internal cameras 68 captures the right eye and the left eye of the user U, respectively, using infrared light or visible light. The control unit 120 can identify directions of the lines of sight of the right eye and the left eye of the user U using images captured by the internal cameras 68. In addition, the HMD 100 can detect the sizes of the pupils of the right eye and the left eye by analyzing the images captured by the internal cameras 68. The HMD 100 may identify the state of miosis or mydriasis of the pupils of the user U based on a change in the size of the pupils. Furthermore, the HMD 100 may detect whether the eyelids of the right eye and the left eye are open or closed based on an image captured by the internal cameras 68.

Figure 3:
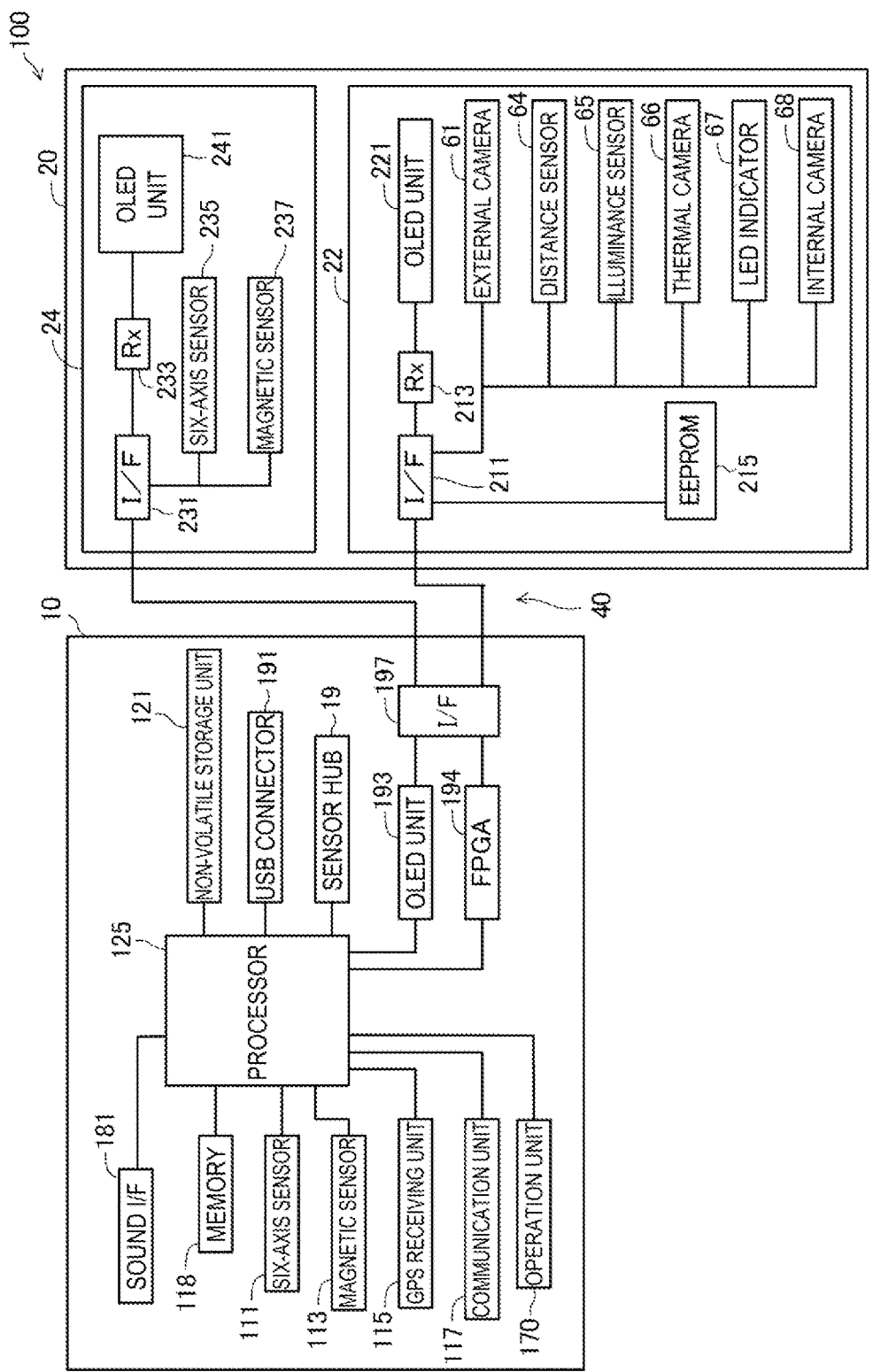
FIG. 3 is a block diagram of the HMD.

FIG. 3 is a block diagram illustrating a configuration of components configuring the HMD 100.

The controller 10 includes a processor 125. The processor 125 includes a CPU, an MPU, or the like. The processor 125 is coupled to a memory 118 and a non-volatile storage unit 121. The memory 118 is, for example, a RAM, and forms a work area that temporarily stores data or programs. The non-volatile storage unit 121 includes a magnetic storage device, a semiconductor storage element such as a flash ROM, or other types of non-volatile storage device. The non-volatile storage unit 121 stores programs to be executed by the processor 125 and data to be processed by the processor 125 in a non-volatile manner. CPU is an abbreviation for Central Processing Unit, and MPU is an abbreviation for Micro Processing Unit. RAM is an abbreviation for Random Access Memory, and ROM is an abbreviation for Read Only Memory.

The processor 125 is coupled to an operation unit 170 as an input device. The processor 125 is coupled to sensors including a six-axis sensor 111, a magnetic sensor 113, and a GPS reception unit 115.

The processor 125 is coupled to a communication unit 117, the sound interface 181, an external memory interface 191, the USB connector 19, a sensor hub 193, and an FPGA 194. These components function as interfaces to external devices. In the following description and drawings, an interface will be abbreviated to I/F. FPGA is an abbreviation for Field Programmable Gate Array.

The controller 10 includes a control board. The processor 125 is mounted on this control board. The six-axis sensor 111, the magnetic sensor 113, the GPS reception unit 115, the communication unit 117, the memory 118, the non-volatile storage unit 121, and the like may be mounted on the control board. The external memory interface 191, the USB connector 19, the sensor hub 193, the FPGA 194, and an interface 197 may be mounted on the control board. Moreover, the connector 42 and the USB connector 19 may be mounted on the control board.

The memory 118 constitutes a work area used to temporarily store a program to be executed by the processor 125, data to be processed by the processor 125, and the like. The non-volatile storage unit 121 is configured as a semiconductor memory device such as flash memory. The non-volatile storage unit 121 stores programs to be executed by the processor 125 and data to be processed by the processor 125.

The operation unit 170 detects operations made on the touch sensor, the wheel operation unit 12, the central key 13, the operation pad 14, the up/down key 15, and the power switch 18 disposed on the LED display unit 17. The operation unit 170 outputs an operation signal corresponding to an operation to the processor 125. The operation unit 170 causes the LED display unit 17 to turn on, blink, or turn off in accordance with control of the processor 125.

The six-axis sensor 111 is an example of a motion sensor that detects a motion of the controller 10. The motion sensor may be paraphrased as an inertia sensor or a movement sensor. The six-axis sensor 111 includes a three-axis acceleration sensor and a three-axis gyro sensor. The magnetic sensor 113 is a three-axis geomagnetic sensor, for example. The six-axis sensor 111 may be an IMU obtained by combining an acceleration sensor and a gyro sensor as a module.

IMU is an abbreviation for Inertial Measurement Unit. The six-axis sensor 111 may be combined with the magnetic sensor 113 to be a module.

The GPS reception unit 115 receives GPS signals with a GPS antenna which is not illustrated. The GPS reception unit 115 detects or calculates coordinates of a current position of the controller 10 based on a GPS signal. GPS is an abbreviation for Global Positioning System.

The six-axis sensor 111, the magnetic sensor 113, and the GPS reception unit 115 output an output value to the processor 125 in accordance with a predetermined sampling period. The six-axis sensor 111, the magnetic sensor 113, and the GPS reception unit 115 may also output a detected value to the processor 125 in response to a request from the processor 125.

The communication unit 117 is a communication device that executes radio communication with an external device. The communication unit 117 includes an antenna which is not illustrated, an RF circuit, a baseband circuit, a communication control circuit, and the like, for example. The communication unit 117 performs wireless communication in conformity with standards such as Bluetooth and a wireless LAN including Wi-Fi. RF is an abbreviation for Radio Frequency. Bluetooth is a registered trademark. Wi-Fi is a registered trademark.

The sound interface 181 is coupled to the right earphone 32, the left earphone 34, and the microphone 63 via the audio connector 46. The sound interface 181 outputs a sound signal to each of the right earphone 32 and the left earphone 34 in accordance with control of the processor 125, and causes the sound to be output. The sound interface 181 outputs a sound signal input from the microphone 63 to the processor 125. The sound interface 181 may include a converter that converts analog sound signals and digital sound data. In this case, digital sound data is input and output between the sound interface 181 and the processor 125.

The HMD 100 is capable of processing stereo sound. Specifically, the sound interface 181 can cause two-channel stereo sound including the channels corresponding to each of the right ear and the left ear of the user U to be output from the right earphone 32 and the left earphone 34.

The external memory interface 191 is an interface on which a portable memory device can be coupled, and includes, for example, a memory card slot into which a card-type recording medium can be inserted to read data and an interface circuit.

The interface 197 couples the sensor hub 193 and the FPGA 194 to the display unit 20.

The sensor hub 193 acquires detection values of the various sensors included in the display unit 20 and outputs the detected values to the processor 125. The FPGA 194 processes data to be transmitted and received between the processor 125 and each part of the display unit 20 and transmits the data via the interface 197.

The display unit 20 is an eyeglasses shape as described above, and the right holding part 21 and the left holding part 23 are members similar to the temples of eyeglasses. The right holding part 21 and the left holding part 23 are each rotatable with respect to the front frame 27. For example, the right holding part 21 and the left holding part 23 are connected to the front frame 27 due to a hinge structure. When the user U wears the display unit 20, the right holding part 21 and the left holding part 23 open at an angle corresponding to the size of the head of the user U.

With the coupling cable 40 and wires inside the display unit 20, which are not illustrated, the controller 10 is separately coupled to the right display unit 22 and the left display unit 24.

The right display unit 22 includes an OLED unit 221 that emits imaging light. The imaging light emitted by the OLED unit 221 is guided to the right light-guiding plate 26 by an optical system including a lens group and the like. The left display unit 24 includes an OLED unit 241 that emits imaging light. The imaging light emitted by the OLED unit 241 is guided to the left light-guiding plate 28 by an optical system including a lens group and the like. OLED is an abbreviation for Organic Light Emitting Diode.

The OLED units 221 and 241 include an OLED panel and a drive circuit that drives the OLED panel. Here, the OLED panel is a self-emitting-type display panel that emits light using organic electro-luminescence. The OLED panel has light-emitting elements arranged in a matrix, each configured to emit red, green, or blue (B) light, for example. The drive circuit selects and energizes the light-emitting elements of the OLED panel according to control of the processor 125 to cause the light-emitting elements of the OLED panel to emit light. This allows the OLED units 221 and 241 to form imaging light, and the imaging light to be guided to the right light-guiding plate 26 and the left light-guiding plate 28 and to be then incident on the right and left eyes of the user U.

The right display unit 22 includes a display unit substrate 210. An interface 211, a reception unit 213, and an EEPROM 215 are mounted on the display unit substrate 210. The interface 211 is coupled to interface 197. The interface 211 couples the reception unit 213, the EEPROM 215, the external camera 61, the illuminance sensor 65, and the LED indicator 67 to the controller 10. The reception unit 213 receives data input from the controller 10 via the interface 211. In the drawing, the reception unit 213 is abbreviated to Rx.

The EEPROM 215 stores data. The EEPROM 215 stores, for example, data about light-emitting properties and display properties of the OLED units 221 and 241, and data about properties of a sensor provided in the right display unit 22 or the left display unit 24. The data stored in the EEPROM 215 can be read by the processor 125. EEPROM is an abbreviation for Electrically Erasable Programmable ROM.

The interface 211 receives input of captured image data, or a signal indicating an imaging result of the external camera 61 from the external camera 61. The interface 211 receives input of a measurement result obtained by measuring the distance to a target object positioned in the detection range of the distance sensor 64, from the distance sensor 64. The interface 211 receives input of a detected value corresponding to an amount of received light and/or an intensity of received light from the illuminance sensor 65. The interface 211 receives input of image data of an infrared image from the thermal camera 66.

The LED indicator 67 turns on and off in accordance with a signal input via the interface 211. The internal camera 68 captures an image and outputs captured image data or a signal indicating the result of imaging to the interface 211. The reception unit 213 receives data transmitted by the processor 125 via the interface 211. The reception unit 213 outputs image data received via the interface 211 to the OLED unit 221.

The left display unit 24 includes the display unit substrate 230. The display unit substrate 230 is mounted with an interface 231 and a reception unit 233. The display unit substrate 230 is further mounted with a six-axis sensor 235 and a magnetic sensor 237. The interface 231 couples the reception unit 233, the six-axis sensor 235, the magnetic sensor 237 to the controller 10. The reception unit 233 receives data input from the controller 10 via the interface 231.

The six-axis sensor 235 is an example of a motion sensor that detects motions of the display unit 20. The six-axis sensor 235 includes a three-axis acceleration sensor and a three-axis gyro sensor. The six-axis sensor 235 may be an IMU with the sensors, described above, formed into a module. The magnetic sensor 237 is a three-axis geomagnetic sensor, for example. The six-axis sensor 235 and the magnetic sensor 237 output detection values or the detection data to the interface 231. These detection values or detection data are output to the processor 125 via the interface 231.

The external camera 61, the distance sensor 64, the illuminance sensor 65, the thermal camera 66, the internal camera 68, the six-axis sensor 235, and the magnetic sensor 237 are coupled to the sensor hub 193 of the controller 10. Control signals are input from the sensor hub 193 to each of these sensors. In addition, the LED indicator 67 is coupled to the sensor hub 193.

The sensor hub 193 sets and initializes a sampling cycle of each sensor in accordance with control of the processor 125. The sensor hub 193 performs energization of each of the sensors, transmission of control data, acquisition of detected values, and the like according to sampling cycles of the sensors. The sensor hub 193 outputs detected values of the sensors to the processor 125 at preset timings. The sensor hub 193 starts and stops energization to the LED indicator 67 following control of the processor 125 and causes the LED indicator 67 to turn on or off or blink at a timing when the external camera 61 starts or ends imaging.

2. Configuration of Control Unit of HMD

Figure 4:
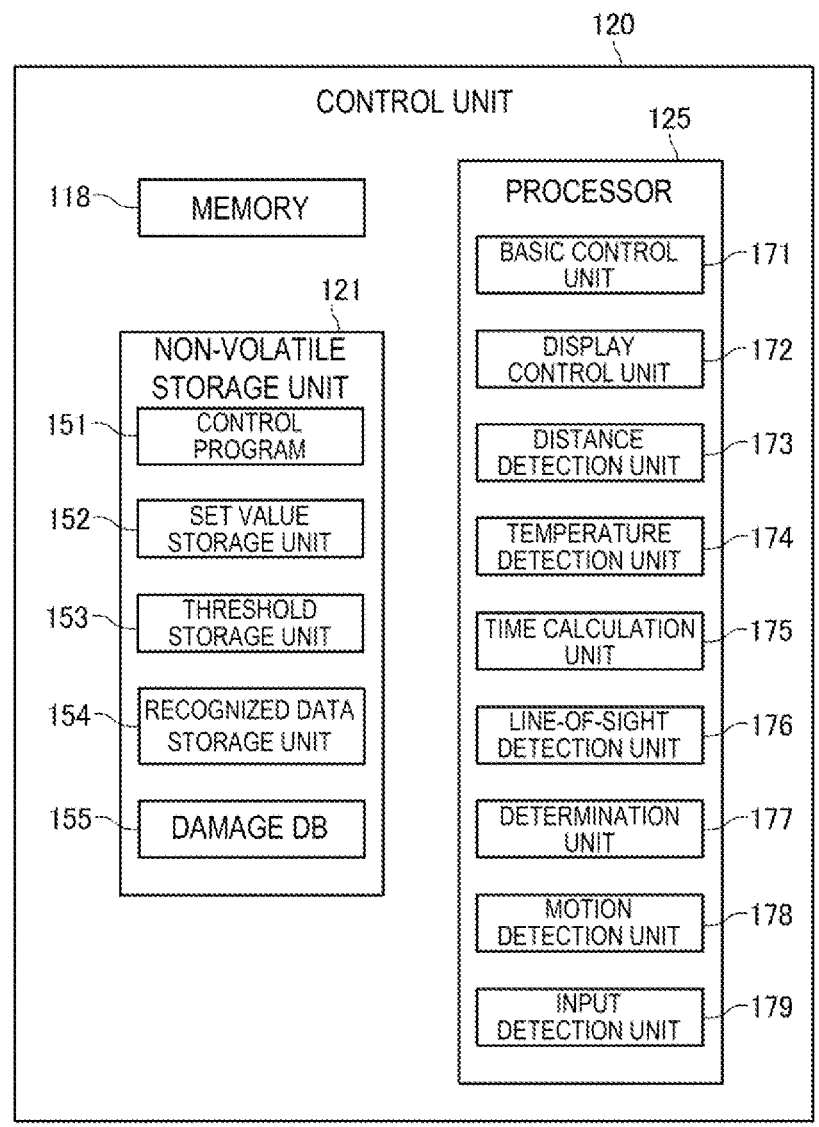
FIG. 4 is a functional block diagram of a control unit.

FIG. 4 is a functional block diagram of the control unit 120 of the HMD 100. The control unit 120 includes the memory 118, the non-volatile storage unit 121, and the processor 125. The control unit 120 may include the EEPROM 215.

The non-volatile storage unit 121 stores a control program 151. The control program 151 is a program to be executed by the processor 125. The non-volatile storage unit 121 includes a set value storage unit 152, a threshold storage unit 153, a recognized data storage unit 154, and a damage database 155. A database will be abbreviated to DB in the following description and drawings. The set value storage unit 152, the threshold storage unit 153, the recognized data storage unit 154, and the damage DB 155 are logical or virtual storage units provided in the storage region of the non-volatile storage unit 121.

The set value storage unit 152 stores various set values for operations of the HMD 100. When the processor 125 uses parameters, matrix formulas, computation formulas, LUTs, and the like to control the HMD 100, the set value storage unit 152 stores them. LUT is an abbreviation for LookUp Table.

The threshold storage unit 153 stores thresholds to be used in processing of the processor 125. For example, the threshold storage unit 153 stores a distance threshold, a time threshold, a display threshold, and a deviation time threshold, which will be described later. A plurality of deviation time threshold values are stored, for example, in association with values of damage information, as will be described below with reference to FIG. 9. The thresholds stored by the threshold storage unit 153 may be input according to an operation made on the operation unit 170, or may be written into the threshold storage unit 153 in the manufacturing process of the HMD 100. In addition, the processor 125 may dynamically purify the threshold values by executing the control program 151, and store them in the threshold storage unit 153. Furthermore, the threshold storage unit 153 may store a plurality of candidates for the thresholds selected by the processor 125.

The recognized data storage unit 154 stores data for the processor 125 to recognize a target object from a captured image of the external camera 61. Target objects include a movable moving object, a facility fixed in a building or on a road, and a shape of a road surface or a floor surface of a road. Moving objects include moving bodies, for example, a train, an automobile, an automatic bicycle, and the like. In addition, moving objects are furniture, home appliances, tools, commodities, including other moving objects, and includes animals and persons other than the user U. Facilities include walls, handrails, and installations such as shelves and decorative items attached thereto. The shape of a road surface or a floor surface of a road includes artificial structures such as stairs, slopes, drain grooves, drain ports, and manholes. In addition, the shape of a road surface or a floor surface of a road may include spontaneous shape such as unevenness, puddles, cracks, depressions, and the like on road surfaces.

As will be described later, the processor 125 performs processing of cutting an image of a target object from a captured image of the external camera 61. In this processing, the processor 125 executes processing of detecting an image of the target object through pattern matching, processing of detecting a target object by using an image analysis algorithm, and processing of detecting a target object included in the captured image through SLAM, and the like. Data required for the processing is stored in the recognized data storage unit 154.

The damage DB 155 is a database including damage information related to damage from the target object to be recognized by the processor 125. The damage from the target object refers to damage that the target object is likely to cause on the user U. This can be referred to as damage to the user U caused by the target object.

The damage that the target object is likely to cause on the user U refers to the harm such as injury inflicted on the body of the user U when the user U contacts or encounters the target object. For example, the damage includes a crash or fall of the user U, falling-down of the user U, a collision of the user U into the target object, an arrival/fall of the target object, a collapse or breaking-down of the target object, and a collision of a target object into the user U. In addition, the damage includes pinching of the body of the user U by the target object, cutting of the body of the user U the target object, drowning of the user U, a contact of the user U with the hot or cold target object, radiation exposure, damage caused by harmful rays, gas poisoning, oxygen deficiency, electric shock, traffic accidents, etc.

The damage DB 155 stores damage information indicating the degree of damage that target object is likely to cause on the user U in association with the type or the name of the target object. For example, the damage information stored in the damage DB 155 is an index calculated by combining a probability of occurrence of damage that target object is likely to cause on the user U and a severity of damage that the target object is likely to cause on the user U. The damage information may be a numerical value. Specifically, the damage information may be an index that quantifies the degree of damage. The damage information may be a numerical value indicating the degree of damage in a stepwise manner. In this case, the damage information can be referred to as a damage level.

A probability of occurrence of damage is determined based on a statistical index for each combination of the type of the target object and the type of damage. A severity of damage is a severity of harm incurred to the user U if the damage occurs. A severity is determined in advance based on, for example, the magnitude of an injury that may occur on the body of the user U, an index of the treatment period, the presence or absence of an aftereffect, and the like. When one target object is likely to be related to a plurality of types of damage, the damage DB 155 stores damage information including the probabilities of occurrence and severities of all types of damage related to the target object. The damage information stored in the damage DB 155 corresponds to an example of first information and second information. In other words, the damage information corresponding to a first target object detected by the distance detection unit 173 corresponds to an example of the first information, and the damage information corresponding to a second target object corresponds to an example of the second information.

The control unit 120 includes a basic control unit 171, a display control unit 172, a distance detection unit 173, a temperature detection unit 174, a time calculation unit 175, a line-of-sight detection unit 176, a determination unit 177, a motion detection unit 178, and an input detection unit 179. Each of these functional units is implemented in cooperation of software and hardware when the processor 125 executes the control program 151.

The basic control unit 171 executes a basic function to control each of the units of the HMD 100. Upon turning on the power of the HMD 100, the basic control unit 171 executes an activation process to initialize each unit of the HMD 100. The basic control unit 171 executes a shut-down process to stop the HMD 100 when the power of the controller 10 is turned off.

The display control unit 172 controls the display unit 20 to cause the display unit 20 to display various screens including images and characters to be visually recognized by the user U.

The distance detection unit 173 detects a target object around the user U based on at least one of a captured image of the external camera 61 and the detection result of the distance sensor 64. The distance detection unit 173 detects the distance between the detected target object and the user U. Furthermore, the distance detection unit 173 may execute, for example, SLAM to create an environment map of the target object around the user U and identify the position of the user U on the environment map. Any one of target objects detected by the distance detection unit 173 corresponds to an example of a first target object, and any target object other than the first target object corresponds to an example of a second target object.

The temperature detection unit 174 detects a temperature of the target object detected by the distance detection unit 173 based on an infrared image captured by the thermal camera 66. The temperature detection unit 174 identifies the position of the target object in the infrared image using at least one of the detection results in which the distance detection unit 173 detects the target object, and the captured image of the external camera 61 used by the distance detection unit 173 to detect the target object. The temperature detection unit 174 sets the temperature of the identified position as the temperature of the target object. When the distance detection unit 173 detects a plurality of target objects, the temperature detection unit 174 detects the temperature of each of the plurality of target objects detected by the distance detection unit 173.

The time calculation unit 175 calculates the time until the target object detected by the distance detection unit 173 comes in contact with the user U. Specifically, the time calculation unit 175 determines the change in the distance between the target object detected by the distance detection unit 173 and the user U, and calculates the relative velocities of the target object and the user U from the determined change. The time calculation unit 175 calculates the time until the distance between the target object and the user U becomes zero based on the relative velocities of the target object and the user U, and the distance between the target object and the user U. Here, the distance detection unit 173 practically detects the distance between the target object and the external camera 61 as the distance between the target object and the user U. Although this distance is the distance between the target object and the display unit 20, it can be substantially considered as the distance between the target object and the user U. Thus, the distance detected by the distance detection unit 173 will be assumed and described as the distance between the target object and the user U.

The distance between the target object and the user U being zero means that the position of the target object matches the position of the user U, or the position of the target object is very close to the position of the user U. In the process of calculating the time until the distance between the target object and the user U becomes zero, the time calculation unit 175 does not distinguish whether the target object is moving or the user U is moving. That is, the time until the distance between the target object and the user U becomes zero is calculated based on the relative velocities of the target object and the user U regardless of whether the target object is moving or the user U is moving.

The time until the distance between the target object and the user U becomes zero is indicative of the time until the target object comes in contact with or encounters the body or clothing of the user U. For example, in a case that the target object is a moving body, when the distance between the target object and the user U is zero, the target object is in contact with the user U. If the target object is a facility that does not move, the distance between the target object and the user U being zero means that the user U is in contact with the target object. If the target object is unevenness of a floor surface, the distance between the target object and the user U being zero means that the user U has reached the position of the target object.

When the distance detection unit 173 detects a plurality of target objects, the time calculation unit 175 calculates the time until the distance between the target objects and the user U becomes zero for each of the plurality of target objects. Specifically, the time calculation unit 175 calculates a first time that a first target object detected by the distance detection unit 173 that requires to reach the user U and a second time that a second target object detected by the distance detection unit 173 that requires to reach the user U.

The line-of-sight detection unit 176 detects the direction of the line of sight of the user U by acquiring and analyzing a captured image of the internal cameras 68.

Figure 5:
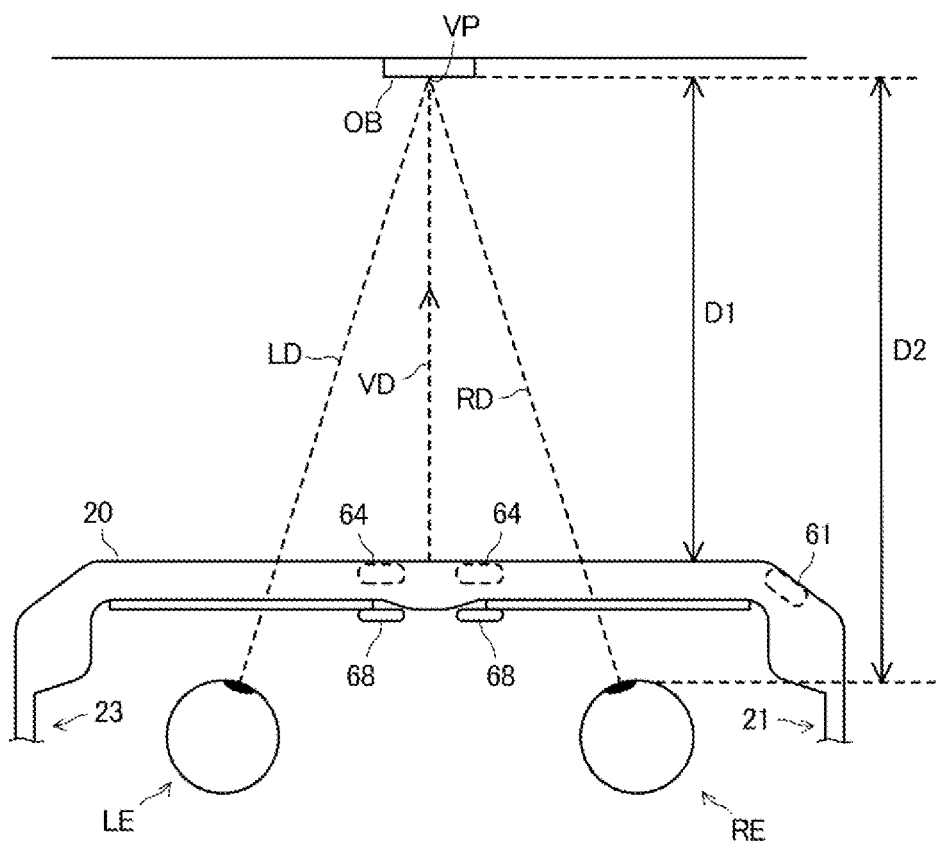
FIG. 5 is a schematic diagram illustrating a state in which a user's line-of-sight direction is detected.

FIG. 5 is a schematic diagram illustrating a state in which the user U's line-of-sight direction is detected.

In FIG. 5, the symbol OB indicates a target object, the symbol RE indicates the right eye of the user U, and the symbol RD indicates a line-of-sight direction of the right eye RE. The symbol LE indicates the left eye of the user U, and the symbol LD indicates a line-of-sight direction of the left eye LE.

The line-of-sight detection unit 176 detects a direction of the line of sight of the user U. Specifically, the line-of-sight detection unit 176 detects a line-of-sight direction RD by analyzing a captured image of the internal camera 68 by capturing the right eye RE. Similarly, the line-of-sight detection unit 176 detects a line-of-sight direction LD by analyzing a captured image of the internal camera 68 by capturing the left eye LE. A position VP where the line-of-sight direction RD intersects the line-of-sight direction LD corresponds to a position on which the user U focuses. This position is referred to as a focus position VP. In other words, the line-of-sight direction RD is a direction in which the right eye RE of the user U directs to the focus position VP, and the line-of-sight direction LD is a direction in which the left eye LE of the user U directs to the focus position VP. The line-of-sight detection unit 176 detects a direction VD from a reference position of the display unit 20 to the focus position VP as a line-of-sight direction VD. The reference position is a position that is predetermined as a reference for the position of the display unit 20, and for example, is the position of the center of the front frame 27 in the lateral direction or the center of the pair of internal cameras 68. The line-of-sight direction VD represents the direction of the line of sight of the eyes of the user U, which is a combination of the line-of-sight direction RD and the line-of-sight direction LD. In other words, the line-of-sight direction VD is the direction from the center of the display unit 20 to the focus position VP.

When the user U focuses on the target object OB, the line-of-sight direction RD and the line-of-sight direction LD of the user U intersect at the position of the target object OB. That is, the focus position VP is in the range in which the focus position overlaps the target object OB. In other words, when the focus position VP is at a position at which the focus position overlaps the target object OB, it can be said that the user U is focusing on the target object OB.

The line-of-sight detection unit 176 may detect a distance D2 from the right eye RE and the left eye LE of the user U to the focus position VP. In this case, by comparing the distance to the target object OB detected by the distance detection unit 173 with the distance D2 detected by the line-of-sight detection unit 176, whether the focus position VP is at a position at which the focus position overlaps the target object OB can be determined more accurately. Here, the distance detected by the distance detection unit 173 is the distance from the display unit 20 which is the installation position of the external camera 61 to the target object OB, as indicated by reference symbol D1 in the drawing. Thus, even when the focus position VP matches the target object OB, there is a difference between the distance D1 and the distance D2 as illustrated in FIG. 5. However, because the difference is small compared to the size of the body of the user U, an accurate determination can be made by simply comparing the distance D1 with the distance D2.

The determination unit 177 calculates the risk level of the target object detected by the distance detection unit 173. A risk level is determined based on damage information stored in the damage DB 155 and the distance to the target object detected by the distance detection unit 173. A risk level is an index showing the level of potential risk of a target object to the user U.

For example, the determination unit 177 calculates a risk level by multiplying a numerical value of damage information by a distance detected by the distance detection unit 173. The determination unit 177 may quantify a distance detected by the distance detection unit 173 into a level of value. In this case, the damage information can be a value obtained by quantifying the size of damage into a level of value as described above, and thus a risk level can be easily calculated by multiplying the value of damage information by the value obtained by quantifying a distance into a level of value.

The determination unit 177 determines an attention level for the target object by correcting the risk level of the target object. Specifically, the determination unit 177 determines an attention level by correcting the risk level of the target object depending on whether the focus position VP overlaps the position of the target object. When the focus position VP overlaps the position of the target object, in other words, the line-of-sight direction VD of the user U is the direction toward the position of the target object.

An attention level is an index to determine whether the user U should pay attention to the target object. In the present embodiment, an attention level is a quantified level of value. Here, when the risk level of the target object is a quantified level of value, the risk level may be set as an attention level as it is.

For example, when the focus position VP overlaps the position of the target object, the determination unit 177 corrects the risk level of the target object to a low value, and the corrected risk level is set as an attention level. When the focus position VP does not overlap the position of the target object, for example, the determination unit 177 sets the risk level of the target object as an attention level as it is.

In addition, when the distance detection unit 173 detects a plurality of target objects, the determination unit 177 calculates the risk levels of the plurality of target objects detected by the distance detection unit 173. Specifically, the determination unit 177 determines the attention level for the first target object by calculating the risk level of the first target object detected by the distance detection unit 173 and correcting the risk level of the first target object. In addition, the determination unit 177 determines the attention level for the second target object by calculating the risk level of the second target object detected by the distance detection unit 173 and correcting the risk level of the second target object. The determination unit 177 sets the target object among a plurality of target objects overlapping the focus position VP as a target object to focus on. The determination unit 177 corrects the risk level of the target object to focus on to a lower level than the risk level of the target objects that are not to focus on and sets the corrected risk level as an attention level. In addition, for example, the determination unit 177 sets the attention levels of the target objects that are not to focus on to be the same as the risk levels of the target objects. For example, when the focus position VP is the position overlapping the first target object, the determination unit 177 may correct the risk level of the second target object to the attention level for the second target object, and the attention level for the first target object to a level lower than the attention level for the second target object.

The determination unit 177 may correct the attention level based on the time calculated by the time calculation unit 175 for the target objects. For example, when a first time calculated by the time calculation unit 175 is shorter than a second time and damage information of the first target object has a value higher than damage information of the second target object, the determination unit 177 may correct the attention level for the first target object to a level higher than the attention level for the second target object.

The determination unit 177 may calculate the risk level of a target object based on the temperature of the target object detected by the temperature detection unit 174. For example, when the temperature of a target object detected by the temperature detection unit 174 is higher or lower than the reference temperature determined based on a possibility of damage being incurred to the user U, the determination unit 177 may calculate the risk level by adding the value of the damage information. The reference temperature determined based on a possibility of damage being incurred to the user U can be a temperature of the target object at which the user U gets burned when the user touches it or a temperature of the target object at which the user U gets frostbite when the user touches it, and may include a high reference temperature and a low reference temperature.

The motion detection unit 178 detects a motion of the body of the user U. The motion detection unit 178 uses a captured image of the external camera 61 to detect a motion of the user U. For example, the motion detection unit 178 detects a movement of a part of the body of the user U not matching the movement of the display unit 20. Here, a part of the body of the user U includes, for example, an arm, a hand, a finger, and a foot. The motion detection unit 178 uses any one or more of the detection results of the six-axis sensor 111 and the detection result of the six-axis sensor 235, without being limited to a captured image of the external camera 61, to detect a motion of the body of the user U. The motion detection unit 178 may detect a motion of the entire body of the user U.

The time calculation unit 175 can calculate the time until the distance between the target object and the user U becomes zero based on a motion of the user U detected by the motion detection unit 178. As described above, the time calculation unit 175 calculates the time based on the relative velocity between the target object and the user U and the distance between the target object and the user U. In this process, the time calculation unit 175 adds up the motion of the user U detected by the motion detection unit 178 and the movement of the display unit 20 to determine the relative velocity between the target object and the user U. Thus, the time until the distance between the target object and the user U becomes zero can be calculated more precisely. In addition, for example, when a motion detected by the motion detection unit 178 is a motion to approach the target object, the time calculation unit 175 may obtain the relative velocity between the target object and the user U by adding up the motion detected by the motion detection unit 178 and the movement of the display unit 20.

The input detection unit 179 receives an operation of the user U on the operation unit 170. The input detection unit 179 may detect input made by a gesture of the user U from a captured image of the external camera 61, or the detection results of the six-axis sensor 111 and the six-axis sensor 235.

Figure 6:
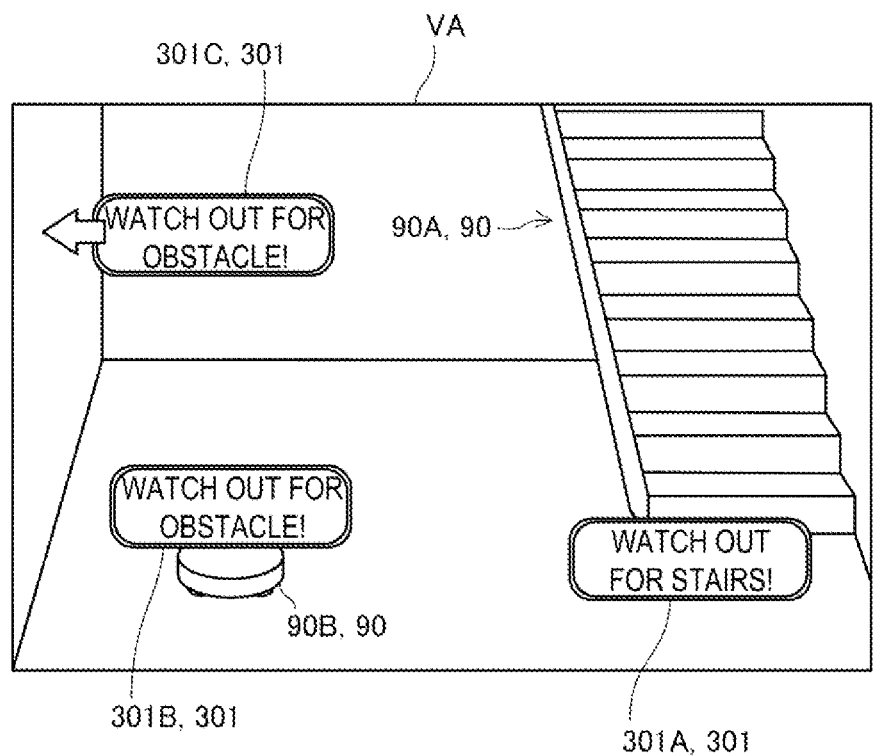
FIG. 6 is a diagram illustrating a display example of the HMD.

FIG. 6 is a diagram illustrating a display example of the HMD 100.

The display control unit 172 gives a notification calling the user U's attention to a target object when the attention level determined by the determination unit 177 is higher than a preset display standard. Examples of the notification method include a method of outputting sound from the right earphone 32 and the left earphone 34, and a method of causing a vibrator, which is not illustrated, to operate. In the present embodiment, a method of causing the display unit 20 to display an image calling the user U's attention at a display position corresponding to the target object that is subject to attention is employed.

Reference symbol VA indicates an image displayed by the display unit 20 or a range in which the user U visually recognizes the outside scene through the display unit 20. In other words, the field of view of the user U in which the user U visually recognizes the outside scene through the display unit 20 corresponds to the range VA.

In the present embodiment, an example in which the range in which the user U visually recognizes an image displayed by the right light-guiding plate 26 and the left light-guiding plate 28 matches the range in which the user U visually recognizes an outside scene through the display unit 20 is shown. This is merely an example, and for example, an image displayed by the right light-guiding plate 26 and the left light-guiding plate 28 may be smaller than the range in which the user U visually recognizes an outside scene through the display unit 20. Also in this case, the image displayed by the right light-guiding plate 26 and the left light-guiding plate 28 overlaps the outside scene visually recognized by the user U through the right light-guiding plate 26 and the left light-guiding plate 28.

FIG. 6 illustrates an example in which the user U is inside a building and there are a plurality of target objects 90A and 90B in the real space. The target objects 90A and 90B will be described as target objects 90 below if they do not need to be distinguished. The same applies to attention images 301 which will be described below.

The target object 90A is stairs, and the target object 90B is a self-propelled robotic vacuum cleaner. The target object 90A has a possibility of causing a risk of the user U falling or colliding. The target object 90B has a possibility of causing a risk of the user U colliding, or a risk of the user U falling due to a collision.

An attention image 301A is an image calling the user U's attention to the target object 90A. The attention image 301A is displayed at a display position overlapping the position at which the target object 90A is visually recognized in the range VA, or a display position in the vicinity of the position at which the target object 90A is visually recognized. This position is referred to as a display position corresponding to the target object 90A. An attention image 301B is an image calling the user U's attention to the target object 90B, and is displayed at a display position corresponding to the target object 90B in the range VA. The attention image 301A and the attention image 301B may be the same image, or may be different images. When the target object 90A corresponds to a first target object, the attention image 301A corresponds to an example of a first image. Similarly, when the target object 90B corresponds to a second target object, the attention image 301B corresponds to an example of a second image.

In addition, the display control unit 172 may display an attention image 301 for a target object not visually recognized in the range VA. An attention image 301C illustrated in FIG. 6 is a target object on the left side of the range VA, and is an image calling the user U's attention to a target object outside the range that the user U can visually recognize through the right light-guiding plate 26 and the left light-guiding plate 28. The attention image 301C includes a left arrow to indicate that a target object is present on the left side of the range VA, The display control unit 172 displays the attention image 301 for the first target object among the plurality of target objects detected by the distance detection unit 173, having the highest attention level determined by the determination unit 177. Although three attention images 301A, 301B, and 301C are illustrated in FIG. 6, the number of attention images 301 displayed by the display unit 20 at the same time is one in the present embodiment. In this case, the attention image 301 has the advantage that it can effectively call the user's attention without interfering with the field of view of the user U and diverting attention of the user U.

The attention images 301A, 301B, and 301C may be displayed by the display control unit 172 based on the image data stored in advance in the non-volatile storage unit 121. In addition, the display control unit 172 may also perform processing for generating image data for displaying the attention images 301A, 301B, and 301C.

3. Operation of Display System

Figure 7:
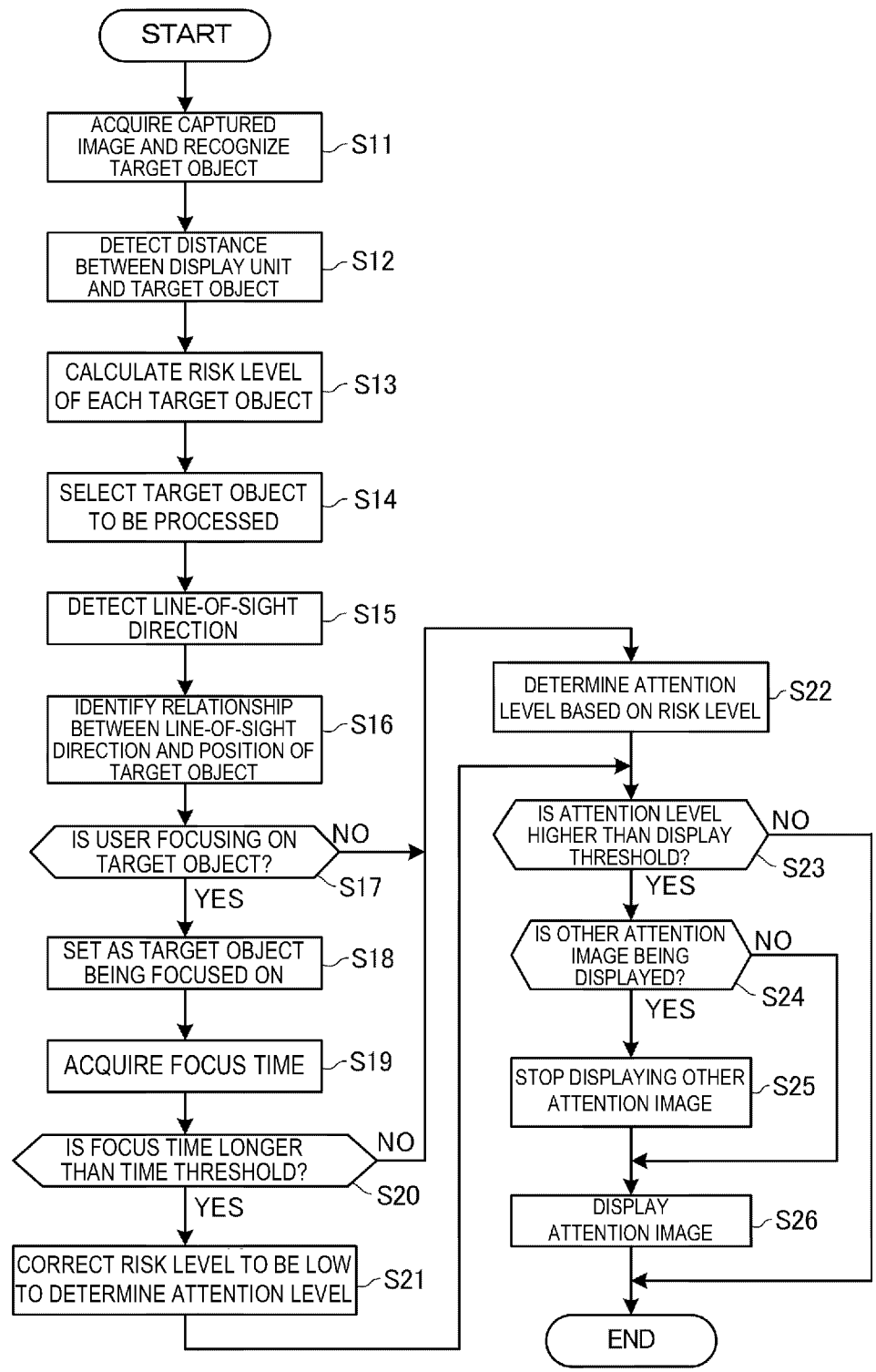
FIG. 7 is a flowchart showing an operation of the HMD.
Figure 8:
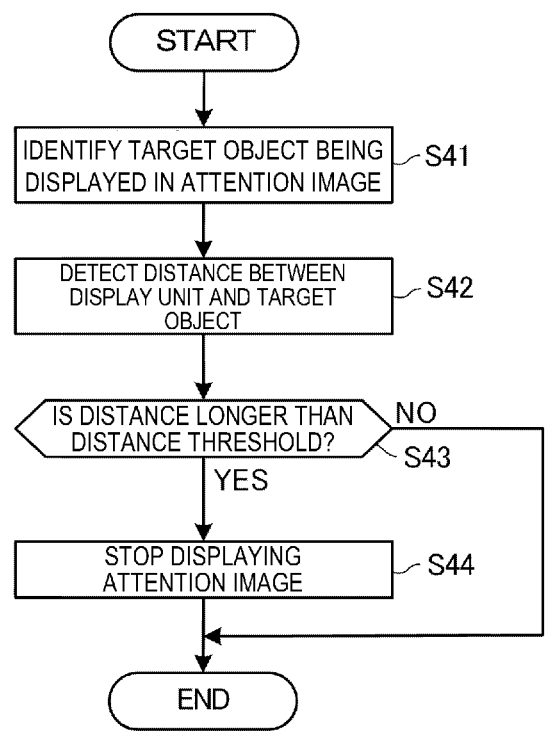
FIG. 8 is a flowchart showing an operation of the HMD.
Figure 9:
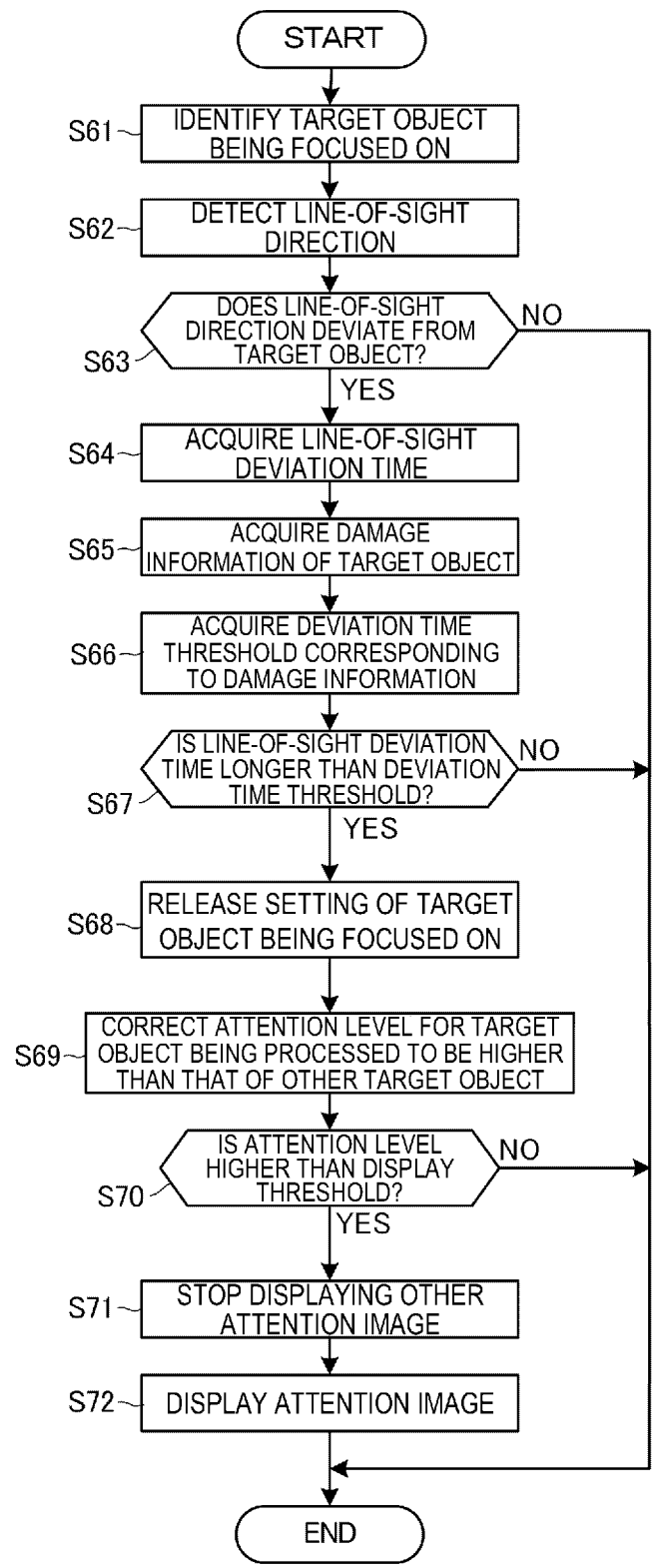
FIG. 9 is a flowchart showing an operation of the HMD.

FIGS. 7, 8, and 9 are flowcharts showing operations of the HMD 100. Each of these drawings shows an operation of the control unit 120 related to display of the attention images 301.

In step S11, the distance detection unit 173 detects a target object projected on a captured image by acquiring and analyzing the captured image of the external camera 61. Next, in step S12, the distance detection unit 173 detects the distance between the display unit 20 and the target object detected in step S11.

Subsequently, in step S13, the determination unit 177 calculates the risk level of the target object detected by the distance detection unit 173. When the distance detection unit 173 has detected a plurality of target objects, the determination unit 177 calculates the risk level of each of the plurality of target objects.

In step S14, the determination unit 177 selects the target object to be processed. In step S15, the line-of-sight detection unit 176 detects the line-of-sight direction VD of the user U. In step S16, the determination unit 177 identifies the relationship between the line-of-sight direction VD and the position of the target object. For example, in step S16, the determination unit 177 identifies whether the line-of-sight direction VD is a direction corresponding to the position of the target object selected in step S14 to be processed.

In step S17, the determination unit 177 determines whether the user U has focused on the target object to be processed based on the result identified in step S16. If the user U is determined not to have focused on the target object to be processed (step S17; NO), the determination unit 177 proceeds to step S22, which will be described later. If the user U is determined to have focused on the target object to be processed, the determination unit 177 proceeds to step S18.

In step S18, the determination unit 177 sets the target object to be processed to the target object on focus. Next, in step S19, the determination unit 177 acquires the time in which the user U has been focusing on the target object to be processed. This time is referred to as a focus time. The focus time is acquired, for example, by analyzing the history of the line-of-sight direction VD detected by the line-of-sight detection unit 176.

In step S20, the determination unit 177 determines whether the focus time is longer than a time threshold. If the focus time is determined to be shorter than or equal to the time threshold (step S20; NO), the determination unit 177 proceeds to step S22. If the focus time is determined to be longer than the time threshold (step S20; YES), the determination unit 177 proceeds to step S21.

In step S21, the determination unit 177 corrects the risk level of the target object to be processed to a lower value, and determines the attention level based on the corrected risk level. For example, the determination unit 177 corrects the risk level of the target object to be processed to be lower by a predetermined level. Furthermore, for example, the determination unit 177 may correct the risk level of the target object to be processed to be lower than the risk levels of other target objects. Furthermore, for example, in step S21, the determination unit 177 performs processing of setting the attention level for the target object to be processed to be lower than the attention level for the target object when the line-of-sight direction does not correspond to the target object to be processed. Thereafter, the determination unit 177 proceeds to step S23.

In step S22, the determination unit 177 determines the attention level based on the risk level of the target object to be processed, and proceeds to step S23.

In step S23, the display control unit 172 determines whether the attention level for the target object to be processed is higher than the display threshold. If the attention level for the target object to be processed is determined to be lower than or equal to the display threshold (step S23; NO), the control unit 120 ends the processing. If the attention level for the target object to be processed is determined to be higher than the display threshold (step S23; YES), the display control unit 172 proceeds to step S24.

In step S24, the display control unit 172 determines whether the attention image 301 for another target object is being displayed. In other words, it is determined whether the attention image 301 for a target object that is not the target object to be processed is being displayed. If it is determined that the attention image 301 for the other target object is not being displayed (step S24; NO), the display control unit 172 proceeds to step S26. If it is determined that the attention image 301 for the other target object is being displayed (step S24; YES), the display control unit 172 proceeds to step S25.

In step S25, the display control unit 172 stops displaying the attention image 301 for the attention image 301 being displayed, that is, the target object that is not the target object to be processed, and proceeds to step S26. In step S26, the display control unit 172 causes the display unit 20 to display the attention image 301 for calling the user's attention to the target object to be processed, and ends the processing.

When the processing illustrated in FIG. 7 ends, the control unit 120 may return to step S14, select the other target object as a new target object to be processed, and continue the process.

Furthermore, the control unit 120 repeatedly executes the processing shown in FIG. 7 in predetermined cycles during an operation of the HMD 100. This periodically updates the attention levels of target objects near the user U. Each time the attention levels are updated, the attention image 301 is displayed as needed, or display of the attention image 301 is stopped.

FIG. 8 shows an operation executed by the control unit 120 while the attention image 301 is being displayed.

In step S41, the display control unit 172 identifies the target object for which the attention image 301 is being displayed. In step S42, the distance detection unit 173 detects the distance between the target object identified in step S41 and the display unit 20. In step S43, the display control unit 172 determines whether the distance detected in step S42 is longer than the distance threshold. If the detected distance is shorter than or equal to the distance threshold (step S43; NO), the display control unit 172 ends the processing. If the detected distance is longer than the distance threshold (step S43; YES), the display control unit 172 proceeds to step S44. In step S44, the display control unit 172 stops display of the attention image 301 being displayed, and ends the processing.

The control unit 120 repeatedly executes the processing shown in FIG. 8 in predetermined cycles during the display of the attention image 301. This allows unnecessary attention images 301 to be quickly not displayed when the target object is far away from the user U.

FIG. 9 shows an operation executed by the control unit 120 in predetermined cycles for the target object set as a target object to be focused on in step S18.

In step S61, the determination unit 177 identifies the target object set as a target object to be focused on. The target object being focused on is a target object at a position overlapping the line-of-sight direction VD of the user U, and the number thereof is basically one. When there are a plurality of target objects being focused on, the determination unit 177 selects any one target object in step S61.

In step S62, the line-of-sight detection unit 176 detects the line-of-sight direction VD. In step S63, the determination unit 177 determines whether the line-of-sight direction VD has deviated from the target object identified in step S61. In step S62, in particular, the determination unit 177 determines whether the line-of-sight direction VD has deviated from the target object based on whether the line-of-sight direction VD detected in step S62 is in the direction overlapping the position of the target object identified in step S61. In other words, the determination unit 177 determines whether the line-of-sight direction VD is the direction to the target object.

If it is determined that the line-of-sight direction VD does not deviate from the target object (step S63; NO), the determination unit 177 ends the processing. If it is determined that the line-of-sight direction VD has deviated from the target object (step S63; NO), the determination unit 177 proceeds to step S64.

In step S64, the determination unit 177 acquires the time in which the line-of-sight direction VD deviates from the target object. This time is referred to as a line-of-sight deviation time. The line-of-sight deviation time is acquired, for example, by analyzing the history of the line-of-sight direction VD detected by the line-of-sight detection unit 176.

Next, in step S65, the determination unit 177 acquires damage information of the target object identified in step S61. Subsequently, in step S66, the determination unit 177 acquires a deviation time threshold corresponding to the value of the damage information. The damage information of the present embodiment is quantified as described above. The threshold storage unit 153 stores a plurality of deviation time thresholds corresponding to the values of the plurality of pieces of damage information.

In step S67, the determination unit 177 determines whether the line-of-sight deviation time is longer than the deviation time threshold. If the line-of-sight deviation time is determined to be shorter than or equal to the deviation time threshold (step S67; NO), the determination unit 177 ends the processing.

If the line-of-sight deviation time is determined to be longer than the deviation time threshold (step S67; YES), the determination unit 177 proceeds to step S68. In step S68, the determination unit 177 releases the setting of the target object being focused on for the target object identified in step S61.

Next, in step S69, the determination unit 177 corrects the attention level for the target object identified in step S61 to a higher level than the attention level for the other target object. In step S70, the display control unit 172 determines whether the attention level corrected in step S69 is higher than the display threshold. If it is determined that the attention level is lower than or equal to the display threshold (step S70; NO), the display control unit 172 ends the processing. If it is determined that the attention level is higher than the display threshold (step S70; YES), the display control unit 172 proceeds to step S71.

In step S71, the display control unit 172 stops displaying the attention image 301 for the other target object. That is, the attention image 301 displayed for the target object other than the target object being processed is not displayed. In step S72, the display control unit 172 causes the display unit 20 to display the attention image 301 to call the user's attention to the target object being processed, and end the processing.

Figure 10:
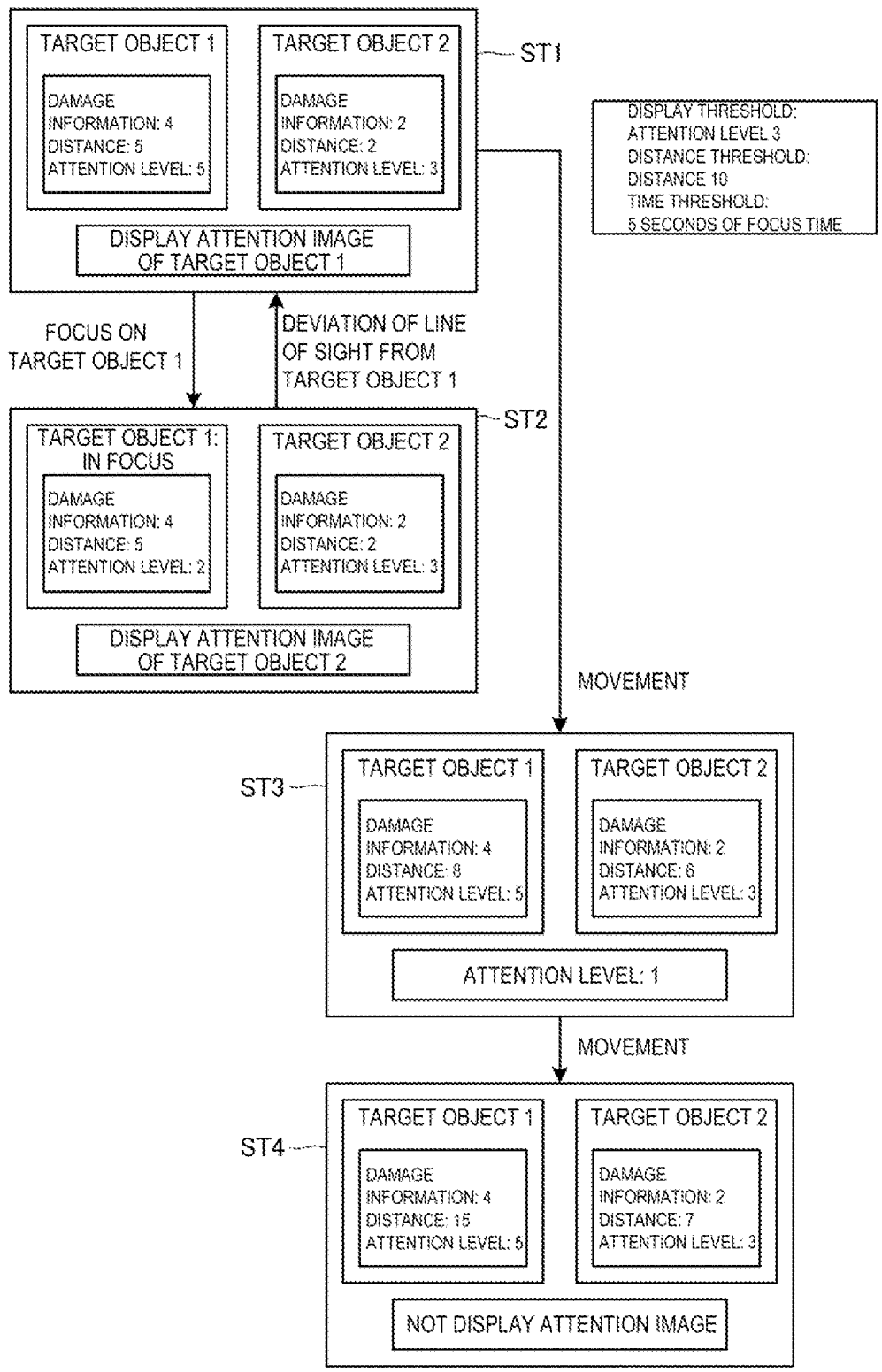
FIG. 10 is an explanatory diagram showing an example of display transitions.

FIG. 10 is an explanatory diagram illustrating an example of transitions of display by the display unit 20, schematically illustrating a state in which display of the attention image 301 transitions according to the operations shown in FIGS. 7 and 8 and 9.

FIG. 10 illustrates an example in which two target objects are detected by the distance detection unit 173. These two target objects are assumed to be a target object 1 and a target object 2. Furthermore, the distance between the display unit 20 and a target object is indicated by a quantified level of value. In the following example, the display threshold is set to an attention level 3, the distance threshold is set to a distance 10, the time threshold is set to a focus time 5 seconds as illustrated in FIG. 10.

State ST1 is a state in which the user U focuses on none of the target objects 1 and 2. The attention level for the target object 1 is a value higher than the attention level for the target object 2. Furthermore, the attention level for the target object 1 is higher than the display threshold. Thus, the attention image 301 is displayed for the target object 1.

When the user U focuses on the target object 1 in the state ST1, the control unit 120 proceeds to state ST2. Because the target object 1 has been set as a target object being focused on in the state ST2, the attention level for the target object 1 is corrected to a lower level than the target object 2. As a result, the attention level for the target object 2 becomes higher than the attention level for the target object 1. The attention level for the target object 2 is higher than the display threshold. For this reason, the attention image 301 is displayed for the target object 2 in the state ST2.

When the line-of-sight direction VD of the user U deviates from the target object 1 in the state ST2, the control unit 120 proceeds to the state ST1. In this case, as the target object 1 is released from the setting as the target object being focused on, no correction is made to lower the attention level for the target object 1, and thus the attention level for the target object 1 is a value higher than the attention level for the target object 2. Thus, the attention image 301 is displayed for the target object 1.

When the user U moves in the state ST1, the distance between the target object 1 and the user U and the distance between the user U and the target object 2 change. The state after the change is indicated as state ST3. In the state ST3, the distance between the target object 1 and the user U and the distance between the user U and the target object 2 are all longer than those in the state ST1. For this reason, the attention level for the target object 1 and the attention level for the target object 2 are all lower than those in the state ST1. The attention level for the target object 1 and the attention level for the target object 2 are updated when the control unit 120 executes the operation of FIG. 7 again after the user U moves or while the user U is moving, and the state turns into the state ST3.

In the state ST3, the attention level for the target object 1 is a value higher than the attention level for the target object 2. Furthermore, the attention level for the target object 1 is higher than the display threshold. Thus, the attention image 301 is displayed for the target object 1.

When the user U further moves in the state ST3, the distance between the target object 1 and the user U and the distance between the user U and the target object 2 change. The state after the change is indicated as state ST4. In the state ST4, the distance between the target object 1 and the user U and the distance between the user U and the target object 2 are all longer than those in the state ST3. For this reason, the attention level for the target object 1 and the attention level for the target object 2 are all lower than those in the state ST3. The attention level for the target object 1 and the attention level for the target object 2 are updated when the control unit 120 executes the operation of FIG. 7 again after the user U moves or while the user U is moving, and the state turns into the state ST4.

In the state ST4, the attention level for the target object 1 is a value higher than the attention level for the target object 2. However, the attention level for the target object 1 is lower than the display threshold. For this reason, the display unit 20 does not display the attention image 301.

4. Effects of Embodiments

The HMD 100 according to the embodiment to which the present disclosure is applied includes the display unit 20 that transmits an outside scene including a first target object and a second target object, and the line-of-sight detection unit 176 that detects the line-of-sight direction VD of the user U as described above. The HMD 100 includes the time calculation unit 175 that calculates a first time that the first target object that requires to reach the user U and a second time that the second target object that requires to reach the user U. The HMD 100 includes the determination unit 177. The determination unit 177 acquires first information related to the first target object and second information related to the second target object, and calculates the risk level of the first target object based on the first information and the first time. The determination unit 177 corrects the risk level of the first target object based on the line-of-sight direction VD, and determines the attention level for the first target object based on the corrected risk level of the first target object. The determination unit 177 calculates the risk level of the second target object based on the second information and the second time, corrects the risk level of the second target object based on the line-of-sight direction VD, and determines the attention level for the second target object based on the corrected risk level of the second target object. The HMD 100 includes the display control unit 172 that causes the display unit 20 to display a first image related to the first target object when the attention level for the first target object is higher than the attention level for the second target object.

A method for controlling the HMD 100 is a method for controlling the HMD 100 including the display unit 20 that transmits an outside scene including a first target object and a second target object, and the line-of-sight detection unit 176 that detects the line-of-sight direction VD of the user U. This method for control includes acquiring, by the control unit 120, first information related to the first target object and second information related to the second target object. Furthermore, the method includes calculating, by the control unit 120, a first time that the first target object that requires to reach the user U and a second time that the second target object that requires to reach the user U. Furthermore, the method includes, calculating, by the control unit 120, the risk level of the first target object based on the first information and the first time. Furthermore, the method includes correcting, by the control unit 120, the risk level of the first target object based on the line-of-sight direction VD, and determining the attention level for the first target object based on the corrected risk level of the first target object. Furthermore, the method includes calculating, by the control unit 120, the risk level of the second target object based on the second information and the second time, correcting the risk level of the second target object based on the line-of-sight direction VD, and determining the attention level for the second target object based on the corrected risk level of the second target object. Furthermore, the method includes causing the display unit 20 to display a first image related to the first target object when the attention level for the first target object is higher than the attention level for the second target object.

According to the HMD 100 and the method for controlling the HMD 100, it is possible to accurately determine an attention level, which is an index indicating whether the user U should pay attention to a target object present around the user U by adding the line-of-sight direction VD thereto. Thus, by displaying the attention image 301 based on the attention level, the HMD 100 can appropriately call the user U's attention to the possibility of an object or the like in the real space posing a risk to the user.

The display control unit 172 causes the display unit 20 to display a second image related to the second target object when the attention level for the second target object is higher than the attention level for the first target object. This makes it possible to display the attention image 301 for the target object having a higher attention level when a plurality of target objects are present around the user U. Thus, it is possible to more appropriately call the user U's attention to the possibility of an object or the like in the real space posing a risk to the user.

The display control unit 172 stops displaying the first image by the display unit 20 when the attention level for the second target object is higher than the attention level for the first target object. Thus, no attention image 301 is displayed for the target object having a lower attention level when a plurality of target objects are present around the user U, and thus the user U's attention can be more appropriately called.

The HMD 100 includes the distance detection unit 173 that detects the distance from the position of the user U to the first target object. When the distance from the position of the user U to the first target object is longer than a first threshold, the display control unit 172 stops displaying the first image by the display unit 20. In this case, the attention image 301 for a target object to which the user U less needs to pay attention because it is far away from the position of the user U is not displayed. Thus, unnecessary display of the attention image 301 can be avoided, and convenience of the user U using the HMD 100 can be improved.

The determination unit 177 sets the attention level for the first target object when the line-of-sight direction VD is the direction corresponding to the position of the first target object to be lower than the attention level for the first target object when the line-of-sight direction VD is a direction not corresponding to the position of the first target object. In this way, the frequency of displaying the attention image 301 for the target object to which the user U directs his or her line of sight is reduced. Thus, unnecessary display of the attention image 301 can be avoided, and convenience of the user U using the HMD 100 can be improved. Furthermore, if the attention level for the target object to which the user U directs his or her line of sight is higher than the display threshold after the correction, the attention image 301 is displayed. Thus, the attention image 301 can be appropriately displayed in response to both the need for the user U to direct his or her attention to the target object and the line-of-sight direction VD of the user U.

The determination unit 177 acquires the focus time in a state in which the line-of-sight direction VD is the direction corresponding to the position of the first target object, and when the focus time exceeds the time threshold, the determination unit sets the attention level for the first target object to be lower than the attention level for the second target object. As a result, the attention image 301 is not displayed for the target object that the user U has focused on during the time exceeding the time threshold, thus unnecessary display of the attention image 301 can be avoided, and the convenience of the user U using the HMD 100 can be improved. Furthermore, it is possible to prevent the attention image 301 from disturbing the user U focusing on the target object.

When the line-of-sight direction VD is a direction not corresponding to the position of the first target object, the determination unit 177 sets the attention level for the first target object to be higher than the attention level for the second target object. Thus, it is possible to more appropriately call the user U's attention to the possibility of an object or the like in the real space posing a risk to the user in association with the line-of-sight direction VD of the user U.

When the line-of-sight direction VD is changed from the direction corresponding to the position of the first target object to a direction not corresponding to the position of the first target object, the display control unit 172 causes the display unit 20 to display the first image related to the first target object again based on the damage information corresponding to the first target object. This makes it possible to re-display the attention image 301 as necessary after the attention image 301 is not displayed in response to the line-of-sight direction VD of the user U directed to the direction of the target object, and to call the user U's attention. Furthermore, because the re-display is performed based on the magnitude of the damage to the user U that may be caused by the first target object, it is possible to avoid unnecessary display of the attention image 301.

The first information is information about the damage caused on the user U by the first target object, and the second information is information about the damage caused on the user U by the second target object. For example, the first information is a value of the damage information of the first target object, and the second information is a value of the damage information of the second target object. This makes it possible to reflect the magnitude of the damage that is likely to be inflicted to the user U from the target object on the determination of an attention level. Thus, it is possible to more appropriately call the user U's attention by precisely evaluating the possibility of an object or the like in the real space posing a risk to the user.

When the first time is shorter than the second time and the damage caused on the user U by the first target object is greater than the damage caused on the user U by the second target object, the determination unit 177 may correct the attention level for the first target object to a level higher than the attention level for the second target object. In this case, the attention image 301 can be displayed for the target object having a possibility of reaching the position of the user U first and inflicting greater damage.

The HMD 100 includes the temperature detection unit 174 that detects a temperature of the first target object and a temperature of the second target object. The determination unit 177 may calculate the risk level of the first target object based on the first information, the first time, and a temperature of the first target object, and may calculate the risk level of the second target object based on the second information, the second time, and a temperature of the second target object. In this case, the determination unit 177 can reflect the damage that is likely to be inflicted to the user U due to the temperature of the target object on the determination of an attention level. Thus, it is possible to more appropriately call the user U's attention by precisely evaluating the possibility of an object or the like in the real space posing a risk to the user.

The HMD 100 includes the motion detection unit 178 that detects motions of the user U. The time calculation unit 175 calculates the first time based on a motion of the user U when the motion of the user U approaching the first target object is detected. The time calculation unit 175 calculates the second time based on a motion of the user U when the motion of the user U approaching the second target object is detected. This makes it possible to more accurately calculate the first time and the second time by reflecting the motions of the user U in addition to the relative velocities of the HMD 100 and the target objects. Thus, it is possible to more appropriately call the user U's attention to the possibility of an object or the like in the real space posing a risk to the user.

The HMD 100 includes the external camera 61 that captures the first target object and the second target object included in an outside scene. The distance detection unit 173 detects a target object based on a captured image of the external camera 61.

5. Other Embodiments

The present disclosure is not limited to the configurations in the exemplary embodiments described above, and can be implemented in various aspects without departing from the gist of the disclosure.

For example, the control unit 120 may detect the distance between the user U and a target object and calculate the time until the target object reaches the user U by reflecting the position of the display unit 20 with respect to the body of the user U. In addition, for example, the control unit 120 may use detection results of the six-axis sensor 235 and/or the magnetic sensor 237 to detect a line-of-sight direction VD.

The device that processes display images of the display unit 20 and/or the sound output from the right earphone 32 and the left earphone 34 is not limited to the controller 10. The HMD 100 may use an external computer in place of the controller 10. In other words, each of the functional units included in the processor 125 illustrated in FIG. 4 may be provided in a computer coupled to the display unit 20, and various numbers and information stored in the non-volatile storage unit 121 may be stored in the computer coupled to the display unit 20. In this case, the processing shown in FIGS. 7, 8, and FIG. 9 is executed by the computer. The HMD 100 may transmit data detected by various sensors included in the display unit 20 and various sensors included in the controller 10 to the computer, and perform display based on display data input from the computer. This type of computer may be, for example, a smartphone, a PDA terminal, or a tablet personal computer.

Although the configuration in which the controller 10 is coupled to the display unit 20 by wire has been illustrated in the exemplary embodiments described above, the present disclosure is not limited thereto, and the display unit 20 may be coupled wirelessly to the controller 10. Furthermore, the controller 10 may be implemented by a plurality of devices. Furthermore, a wearable device attachable to the body or clothes of the user, or to the personal adornments worn by the user may be used instead of the controller 10. The wearable device in such a case may be, for example, a watch-like device, a ring-like device, a laser pointer, a mouse, an air mouse, a game controller, a pen-like device, or the like.

In addition, the configuration in which the display unit 20 is separated from the controller 10 but they are coupled via the coupling cable 40 has been illustrated as an example in the exemplary embodiments described above. The disclosure is not limited thereto, and the controller 10 and the display unit 20 may be integrated and worn on the head of a user.

In addition, the display unit 20 is not limited to being mounted directly on the head of the user U. Instead of the display unit 20, for example, an image display unit of another type such as an image display unit worn like a hat may be adopted.

A variety of configurations can be employed as long as the optical system that guides image light to the eyes of a user causes image light to be incident on the eyes of the user using the right light-guiding plate 26 and the left light-guiding plate 28. For example, a configuration in which a half mirror is provided on a portion of the right light-guiding plate 26 and the left light-guiding plate 28, and image light generated by the right light-guiding plate 26 and the left light-guiding plate 28 is reflected by the half mirror to the right eye RE and the left eye LE of the user U may be exemplified. In addition, an image may be displayed on the entire surface of the right light-guiding plate 26 and the left light-guiding plate 28, or in a display region occupying the most part of the surface. In such a case, a process for reducing an image may be included in an operation for changing a display position of an image. In addition, a diffraction grating, a prism, a holographic display unit may be used as the right light-guiding plate 26 and the left light-guiding plate 28.

Furthermore, although the configuration in which the display unit 20 generates image light using the OLED units 221 and 241 has been described in the exemplary embodiment, the present disclosure is not limited thereto. For the right display unit 22 and the left display unit 24, for example, a transmissive liquid crystal panel may be employed, a reflective liquid crystal panel may be employed instead of a transmissive liquid crystal panel, and a digital micromirror device may be employed. In addition, a configuration to which an LCoS technology is applied may be used instead of an LCD panel. LCoS is an abbreviation for "Liquid Crystal On Silicon".

Furthermore, the display unit 20 may be configured using a self-emitting-type display element represented by an LED array, a laser array, a quantum dot light emitting device, or the like. Furthermore, the display unit 20 may be, for example, a laser scanning-type display in which a laser light source and a laser scanner are combined.

In addition, at least some of the functional blocks illustrated in FIGS. 3 and 4 may be realized by hardware and by cooperation of hardware and software, and the present disclosure is not limited to a configuration in which independent hardware resources are arranged as illustrated in the figures.

Furthermore, the processing of the flowcharts illustrated in FIGS. 7, 8, and 9 is divided into units according to the main content of the processing to make the processing by the control unit 120 easier to understand. The embodiments are not limited by the way of dividing the processing units of each flowchart or the names thereof. Furthermore, the processing order of the above-described flowchart is also not limited to the illustrated example.

In addition, programs executed by the processor 125 may be stored in an external apparatus or device, and may be acquired via the communication unit 117 or the like. Furthermore, the programs can also be recorded in a computer-readable recording medium. The recording medium can be a magnetic or optical recording medium, or a semiconductor memory device. Specifically, a flexible disk, various optical discs, a magneto-optical disk, a flash memory, a card-type recording medium, or a fixed-type recording medium is exemplified. In addition, the recording medium may be a non-volatile storage device such as a RAM, a ROM, or an HDD that is an internal storage device included in an image display apparatus.

What is claimed is:

1. A head-mounted display apparatus comprising:
a display unit that transmits an outside scene including a first target object and a second target object;
a line-of-sight detection unit that detects a line-of-sight direction of a user;
a time calculation unit that calculates a first time and second time, the first time being a time that the first target object requires to reach the user, and the second time being a time that the second target object requires to reach the user; and
a determination unit that acquires a first information about the first target object and a second information about the second target object, that calculates a risk level of the first target object based on the first information and the first time, and that calculates a risk level of the second target object based on the second information and the second time, wherein
the display unit displays a first image related to the first target object when an attention level for the first target object based on the line-of-sight direction and the risk level of the first target object is higher than an attention level for the second target object based on the line-of-sight direction and the risk level of the second target object.

2. The head-mounted display apparatus according to claim 1, wherein
the display unit displays a second image related to the second target object when the attention level for the second target object is higher than the attention level for the first target object.

3. The head-mounted display apparatus according to claim 2, wherein
the display unit stops displaying the first image when the attention level for the second target object is higher than the attention level for the first target object.

4. The head-mounted display apparatus according to claim 1, comprising:
a distance detection unit that detects a distance from a position of the user to the first target object, wherein
the display unit stops displaying the first image when a distance from a position of the user to the first target object is longer than a first threshold.

5. The head-mounted display apparatus according to claim 1, wherein
the determination unit sets the attention level for the first target object when the line-of-sight direction is a direction corresponding to a position of the first target object to be lower than the attention level for the first target object when the line-of-sight direction is a direction not corresponding to the position of the first target object.

6. The head-mounted display apparatus according to claim 5, wherein the determination unit acquires a focus time in a state in which the line-of-sight direction is the direction corresponding to the position of the first target object, and when the focus time exceeds a time threshold, the determination unit sets the attention level for the first target object to be lower than the attention level for the second target object.

7. The head-mounted display apparatus according to claim 5, wherein
when the line-of-sight direction is a direction not corresponding to the position of the first target object, the determination unit sets the attention level for the first target object to be higher than the attention level for the second target object.

8. The head-mounted display apparatus according to claim 6, wherein
when the line-of-sight direction is changed from the direction corresponding to the position of the first target object to a direction not corresponding to the position of the first target object, the display unit displays the first image again based on the first information.

9. The head-mounted display apparatus according to claim 1, wherein
the first information is information about damage caused on the user by the first target object, and
the second information is information about damage caused on the user by the second target object.

10. The head-mounted display apparatus according to claim 9, wherein
when the first time is shorter than the second time and the damage caused on the user by the first target object is greater than the damage caused on the user by the second target object, the determination unit corrects the attention level for the first target object to be higher than the attention level for the second target object.

11. The head-mounted display apparatus according to claim 1, comprising:
a temperature detection unit that detects a temperature of the first target object and a temperature of the second target object, wherein
the determination unit calculates the risk level of the first target object based on the first information, the first time, and the temperature of the first target object, and calculates the risk level of the second target object based on the second information, the second time, and the temperature of the second target object.

12. The head-mounted display apparatus according to claim 1, comprising:
a motion detection unit configured to detect a motion of the user, wherein
the time calculation unit calculates the first time based on a motion of the user approaching the first target object when the motion of the user is detected, and calculates the second time based on a motion of the user approaching the second target object when the motion of the user is detected.

13. A method for controlling a head-mounted display apparatus, the method comprising:
acquiring a first information about a first target object and second information about a second target object;
detecting a line-of-sight direction of a user;
calculating a first time and a second time, the first time being a time that the first target object requires to reach the user, and the second time being a time that the second target object requires to reach the user;
calculating a risk level of the first target object based on the first information and the first time;
calculating a risk level of the second target object based on the second information and the second time; and
displaying a first image related to the first target object when an attention level for the first target object based on the line-of-sight direction and the risk level of the first target object is higher than an attention level for the second target object based on the line-of-sight direction and the risk level of the second target object.

* * * * *